May 20, 1930.                C. MILLER                1,758,962
                           MASSAGE DEVICE
                        Filed April 30, 1928
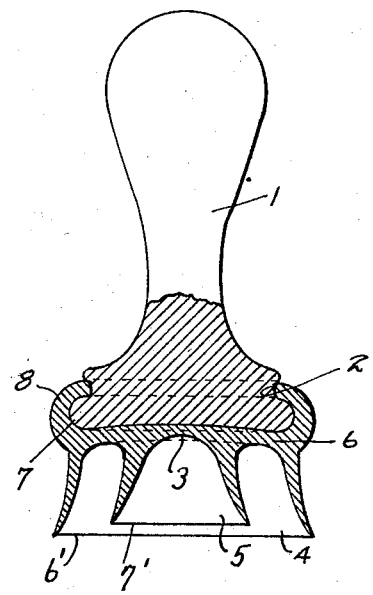
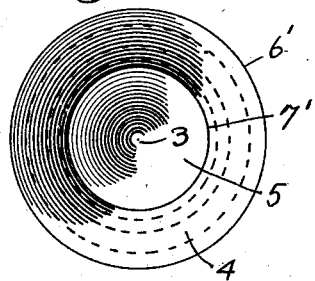  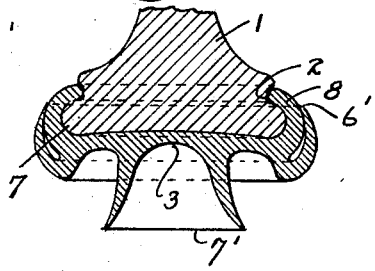
INVENTOR.
CARL MILLER
BY
ATTORNEYS.

Patented May 20, 1930

1,758,962

UNITED STATES PATENT OFFICE

CARL MILLER, OF SAN FRANCISCO, CALIFORNIA

MASSAGE DEVICE

Application filed April 30, 1928. Serial No. 274,007.

My invention relates to improvements in massaging devices, and it consists of the combinations, constructions, and arrangements hereinafter described and claimed.

An object of my invention is to provide a massaging device which comprises a plurality of vacuum cups, one being disposed within the other, the inside one being of less height than the outer one. This construction gives a greater suction effect and massages the skin more effectively than is possible with a single cup.

A further object of my invention is to provide a device of the type described in which the vacuum cups are fashioned from an integral piece of rubber and are removably secured to a handle having a recess for permitting the cups to give slightly when they are brought against the skin, thus causing them to conform to the surface of the skin, and to create the necessary vacuum effect.

A further object of my invention is to provide a device of the type described in which the outer cup may be folded back into an out-of-the-way position for permitting the smaller inner cup to be used to get at places on the body too small for effective massaging by the larger cup such as, for example, the portion of the skin along the sides of the nose.

Other objects and advantages will appear in the following specification, and the novel features of the device will be particularly pointed out in the appended claims.

My invention is illustrated in the accompanying drawing forming a part of this application, in which Figure 1 is a vertical section through the device showing the top of the handle in elevation;

Figure 2 is a bottom plan view of the device; and

Figure 3 is a view similar to Figure 1 but showing the outer cup rolled back.

In carrying out my invention, I provide a handle 1 having an annular groove 2 and a concave end 3. To the concave end I secure the vacuum cups.

I show two cups 4 and 5 as extending from a base portion 6. It is obvious that more cups may be provided if desired without departing from the spirit and scope of my invention. A bead 7 is formed between the groove 2 and the concave end 3, and this bead receives a lip 8 extending from the base 6.

In normal position, the base 6 will extend straight across the end of the handle, and there will be a space between the base and the concave end 3. When the device is applied to the skin, the base will be forced against the concave end as shown in Figure 1.

The cups 4 and 5 are provided with tapered sides that curve outwardly. The rubber forming the cups is flexible enough to feel soft to the skin, and the thinly tapered edges of the cups will conform to the irregular surface of the skin and will provide a partial seal which will create the necessary vacuum within the cups.

The rim 6' of the outer cup 4 extends beyond the rim 7' of the inner cup 5, and therefore the outer cup will be the first to engage with the face. The inner cup will then engage, and the result will be a greater vacuum effect than is possible with a single cup.

When the person desires to get at small portions of the skin, he can roll back the outer cup as shown in Figure 3. The inner cup may now be used in the ordinary manner, and is of small enough diameter to work upon small portions of the skin.

The device may be readily cleaned, and this is accomplished by removing the lip or flange 8 from the handle 1 and washing the entire rubber portion of the device. The handle 1 may also be cleaned in the same manner.

Although I have shown and described one embodiment of my invention, it is to be understood that the same is susceptible of various changes, and I reserve the right to employ such changes as may come within the scope of the appended claims.

I claim:

1. A massaging device comprising a handle having a concave end and an annular groove disposed adjacent to the end, a pair of vacuum cups, one being disposed within the other and both being cast from rubber, said cups having a common base and a curved flange extending therefrom, the end of said flange being received in the groove.

2. A massaging device comprising a plurality of vacuum cups formed of a flexible material, said cups being disposed one within the other and having a common base, the outer cup being foldable into an out-of-the-way position for permitting the unobstructed use of the inner cup, the outer cup, when in folded position, snugly embracing the common base of the cups.

Signed at San Francisco, in the county of San Francisco and State of California, this 21st day of April, A. D. 1928.

CARL MILLER.